US011929979B1

(12) United States Patent
Parvataneni et al.

(10) Patent No.: US 11,929,979 B1
(45) Date of Patent: Mar. 12, 2024

(54) SYSTEMS AND METHODS FOR EDGE-AWARE DOMAIN NAME RESOLUTION

(71) Applicant: Verizon Patent and Licensing Inc., Basking Ridge, NJ (US)

(72) Inventors: Raghuram Parvataneni, Plano, TX (US); Anil K. Guntupalli, Irving, TX (US); Parry Cornell Booker, Sunnyvale, TX (US); Urvika Vummadisetty, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/190,390

(22) Filed: Mar. 27, 2023

(51) Int. Cl.
*H04L 61/4511* (2022.01)

(52) U.S. Cl.
CPC .................. *H04L 61/4511* (2022.05)

(58) Field of Classification Search
CPC .................................... H04L 61/4511
USPC ....................................... 709/245
See application file for complete search history.

(56) References Cited

U.S. PATENT DOCUMENTS

| | | | |
|---|---|---|---|
| 2013/0097329 A1* | 4/2013 | Alex | H04L 61/2567 709/228 |
| 2016/0323365 A1* | 11/2016 | Wu | H04L 67/52 |
| 2016/0352851 A1* | 12/2016 | Eriksson | H04L 67/288 |
| 2021/0307018 A1* | 9/2021 | Qaisrani | H04W 4/50 |
| 2022/0263788 A1* | 8/2022 | Lee | H04L 61/4511 |

* cited by examiner

*Primary Examiner* — Wing F Chan
*Assistant Examiner* — Leon Y Tseng

(57) ABSTRACT

A system described herein may maintain first information associating Uniform Resource Locator ("URLs") with respective Internet Protocol ("IP") addresses of one or more edge computing devices. The system may maintain second information associating User Equipment ("UE") identifiers with one or more locations. The system may receive a request, from a UE, including an identifier of the UE and a URL, may identify a location of the particular UE based on the identifier of the particular UE, and may compare the URL to the URLs included in the first information. The system may select a particular edge computing device based on the location of the particular UE, and may output, in response to the request, a particular IP address of the selected edge computing device.

20 Claims, 8 Drawing Sheets

SYSTEMS AND METHODS FOR EDGE-AWARE DOMAIN NAME RESOLUTION

BACKGROUND

Wireless networks may provide wireless connectivity to User Equipment ("UEs") such as mobile phones, tablets, Internet of Things ("IoT") devices, or other types of devices. Wireless networks may deploy edge computing systems at various geographical locations in order to provide lower latency service to UEs that are located in or near such geographical locations.

DETAILED DESCRIPTION OF EXAMPLE EMBODIMENTS

The following detailed description refers to the accompanying drawings. The same reference numbers in different drawings may identify the same or similar elements.

Wireless networks may deploy edge computing devices, such as Multi-Access/Mobile Edge Computing ("MEC") devices, referred to sometimes herein simply as a "MECs," that are deployed in geographically distinct regions. MECs or other edge computing devices (referred to herein simply as "MECs" for the sake of brevity) may, for example, be co-located with base stations of a RAN and/or may otherwise be communicatively coupled to a RAN. MECs may accordingly provide services, such as traffic processing services, gaming services, augmented reality services, autonomous driving assistance services, etc. to UEs without the need for traffic associated with such UEs to be provided to or from a wireless network core or some other external network.

Particular applications, that are associated with services provided via MECs, may be associated with different Service Level Agreements ("SLAs"), Quality of Service ("QoS") thresholds, latency thresholds, or the like (referred to herein simply as "SLAs" for the sake of brevity). As such, the selection of particular MECs to provide services to respective UEs may be performed based on factors such as, for example, MEC location, UE location, MEC performance and/or load metrics (e.g., latency metrics, throughput metrics, hardware resource capacity or utilization, etc.). As provided herein, such MEC selection may be performed in conjunction with a Domain Name System ("DNS") request, in which a UE requests locator information (e.g., an Internet Protocol ("IP") address or other suitable locator information) associated with a particular application provider, service, etc. In this manner, the UE may be able to receive service from a suitable MEC without needing to provide location information or implement an application programming interface ("API") with a MEC discovery service. Thus, UEs without location determination capability, which may include IoT devices, lightweight devices, etc. may be able to receive a service from a MEC according to a set of SLAs associated with the service. From the standpoint of such UEs, embodiments provide for UEs to receive services from MECs selected based on UE location, without the UEs needing to perform any procedures that differ from ordinary DNS techniques (e.g., resolution of query domain names by communicating with a system that provides IP addresses in response to the query domain names).

Figure 1:
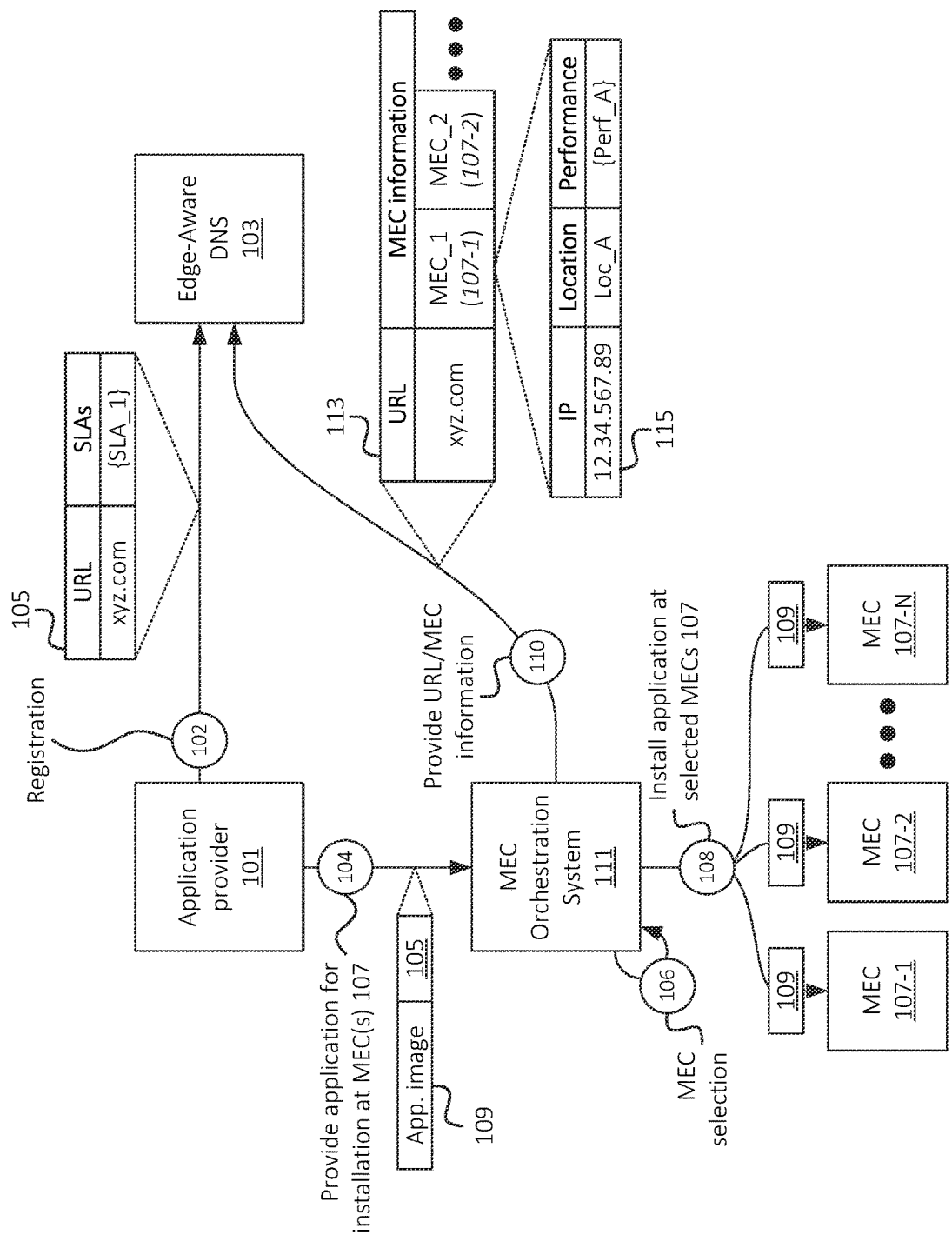
FIG. 1 illustrates an example overview of one or more embodiments described herein.

As shown in FIG. 1, a particular application provider 101 may register (at 102) with Edge-Aware Domain Name System ("EADNS") 103. Application provider 101 may be, may include, or may otherwise be associated with an application server, a content provider system, and/or other suitable device or system that provides services via one or more networks to one or more User Equipment ("UEs"), such as mobile telephones, IoT devices, or the like. EADNS 103, as discussed below, may include one or more devices or systems that receive queries, such as domain name queries, and provide responses that may include locator information such as Internet Protocol ("IP") addresses. For example, EADNS 103 may "resolve" domain name queries, which may include domain names, Uniform Resource Locators ("URLs"), or other "friendly" resource identifiers (referred to herein simply as "URLs" for the sake of brevity), into IP addresses or other types of addresses or resource locators. In accordance with embodiments described herein, EADNS 103 may further identify queries that are associated with MEC-enabled services (e.g., services that may be provided by different MECs), and may select a particular MEC in response to the query.

The registration (at 102) of a particular application provider 101 may include receiving, from application provider 101 (and/or from some other suitable device or system), information indicating a particular URL and a set of associated SLAs. Such information is represented in FIG. 1 as data structure 105. In practice, other representations of the information provided (at 102) by application provider 101 may be used. Generally, each URL provided by application provider 101 may be associated with a particular service or set of services provided by application provider 101. Such service (or services) may also be associated with a particular set of SLAs (e.g., thresholds, QoS parameters, etc.). For example, a gaming service may be associated with a set of SLAs that include a relatively low latency threshold and a relatively low throughput threshold, a file transfer service may be associated with a set of SLAs that include a relatively high throughput threshold and a relatively high latency threshold (or no latency threshold), etc. In this example, the URL "xyz.com" may refer to a URL via which a particular service is provided, where such service is associated with a particular set of SLAs denoted as "{SLA_1}." In some embodiments, the URL may be provided as a regular expression (e.g., including one or more "wild card" characters such as a "*" character), and/or with conditions or parameters (e.g., "starts with," "ends with," "contains," etc.) based on which a matching URL may be identified. In the event that application provider 101 offers multiple services with different SLAs, application provider 101 may register (at 102) different URLs (e.g., one URL per service or set of services that are each associated with a respective set of SLAs) with EADNS 103. In this manner, EADNS 103 may maintain SLAs for respective URLs that are associated with one or more services offered by one or more application providers 101.

Application provider 101 may also provide (at 104) an application for installation at one or more MECs 107. Providing the application may include providing an application image, an application installation package, a link or pointer (e.g., to an application image or application installation package), and/or other suitable resource (referred to herein simply as "application image" 109 for the sake of brevity) to a device or system that orchestrates, controls, etc. one or more MECs 107 (e.g., MEC Orchestration System ("MOS") 111). MOS 111 may implement an orchestration and/or containerization system (e.g., the open-source Kubernetes API or some other suitable API or system) that configures, provisions, instantiates, etc. applications, containers, etc. on one or more MECs 107. Application provider 101 may also provide (at 104) some or all of the information provided to EADNS 103 for each application (e.g., for each application image 109). For example, application provider 101 may provide a URL associated with a particular application, as well as a set of SLAs for each application (e.g., some or all of the information reflected in data structure 105).

MOS 111 may select (at 106) a particular set of MECs 107, on which to install application image 109 associated with the particular application. MOS 111 may, for example, select a set of geographically diverse MECs 107 on which to install application image 109 based on factors such as locations of MECs 107, locations of expected or predicted demand for the application, performance and/or load metrics of MECs 107, and/or other suitable factors. In some scenarios, the selection (at 106) of the particular MECs 107 may include selecting some, but not all MECs 107 to which MOS 111 is communicatively coupled (e.g., not all MECs 107 that are controlled, configured, etc. by MOS 111). MOS 111 may proceed to install (at 108) the application at the selected MECs 107, which may include providing application image 109 to each selected MEC 107 along with instructions to install application image 109, to provision resources for application image 109, and/or other to perform suitable operations.

MOS 111 may provide (at 110) an indication of the URL associated with the installed application, as well as information associated with each MEC 107 on which the application was installed. In this example, MOS 111 provides (at 110) such information to EADNS 103. In some embodiments, MOS 111 may provide the information to application provider 101 and/or some other device or system, which may forward some or all of the information to EADNS 103. The information provided (at 110) is represented in FIG. 1 as data structure 113. As shown, data structure 113 may include the URL associated with the application, as well as information associated with each MEC 107 on which the application is installed.

The information associated with a particular MEC 107-1 is represented in FIG. 1 as data structure 115. Other instances of data structure 115 (and/or similar information) may be included for each MEC 107 of the selected set of MECs 107. As shown, data structure 115 may include an IP address for MEC 107-1 (also referred to in the figures as "MEC_1"), such as the example IP address "12.34.567.89." Data structure 115 may also include additional information associated with MEC 107-1, such as a location of MEC 107-1 (represented as "Loc_A"), which may include geographical coordinates, Global Positioning System ("GPS") coordinates, a cell tracking area, a cell sector, a geographical region, a particular base station of a RAN with which MEC 107-1 is co-located, or other indication of a location with which MEC 107-1 is associated. In some embodiments, data structure 115 may include a set of performance and/or load information associated with MEC 107-1 (represented as "{Perf_A}"). The performance and/or load information may, in some embodiments, be provided (e.g., by MOS 111 or some other suitable device or system) in real time or may otherwise be updated on an ongoing basis, such that EADNS 103 receives up-to-date performance and/or load information associated with MECs 107. The performance and/or load information for MEC 107-1 may include, for example, an indication of an amount of utilized and/or available resources (e.g., processor resources, memory resources, storage resources, etc.) associated with MEC 107-1. In some embodiments, the performance and/or load information for MEC 107-1 may include performance metrics, such as a measure of latency associated with MEC 107-1 (e.g., reflecting a theoretical or actual measure of latency for communications between MEC 107-1 and one or more UEs that communicate with MEC 107-1), a measure of throughput associated with MEC 107-1, and/or other performance metrics.

In some embodiments, the performance information may include granular performance information that reflects performance of communications between MEC 107-1 and UEs located in different locations. For example, data structure 115 may reflect that UEs in a first location (e.g., within 1 km of MEC 107-1) communicate with MEC 107-1 with a first measure of latency, while UEs in a second location (e.g., between 1 km and 3 km from MEC 107-1) communicate with MEC 107-1 with a second measure of latency. That is, for example, due to distance or other factors, UEs that are farther away from MEC 107-1 may receive service with higher latency than UEs that are closer to MEC 107-1. In some embodiments, data structure 115 may additional or different MEC information from the example MEC information described above.

Figure 2:
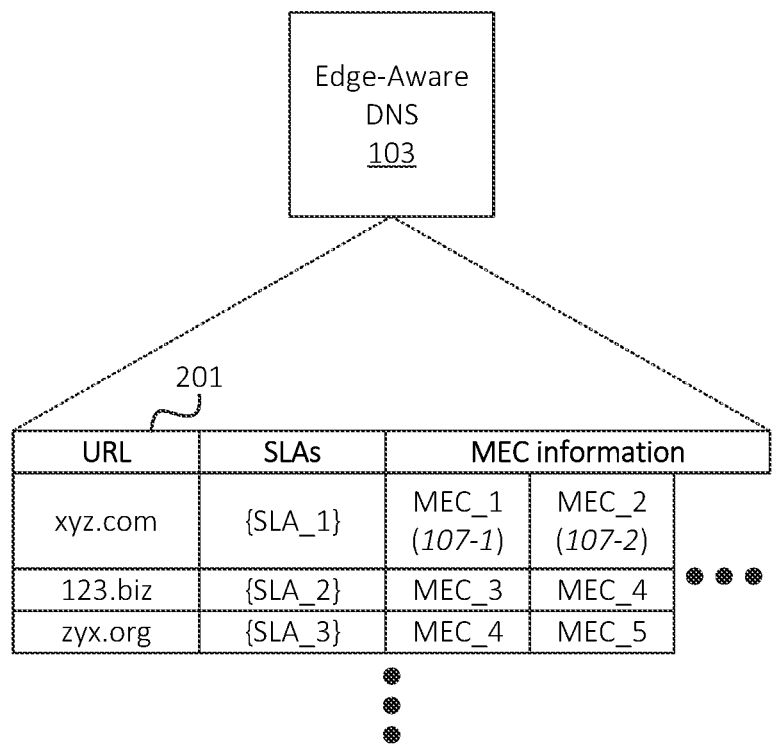
FIGS. 2 and 3 illustrate example information that may be maintained to facilitate edge-aware domain name resolution, in accordance with some embodiments.

In this manner, EADNS 103 may maintain information associated with MECs 107 on which multiple applications (e.g., associated with multiple different URLs) are installed. For example, as shown in FIG. 2, EADNS 103 may maintain example data structure 201, which includes information for applications associated with the respective example URLs "xyz.com," "123.biz," "zyx.org," etc. Data structure 201 may include information for a first set of MECs 107 associated with xyz.com, a second set of MECs 107 associated with 123.biz, and a third set of MECs 107 associated with zyx.org. In some scenarios, the same MEC 107 may have multiple applications installed. For example, as shown in data structure 201, the application associated with 123.biz may be installed on MEC_4 (and, in some scenarios, one or more other MECs 107), and the application associated with zyx.org may also be installed on MEC_4 (and, in some scenarios, one or more other MECs 107).

Figure 3:
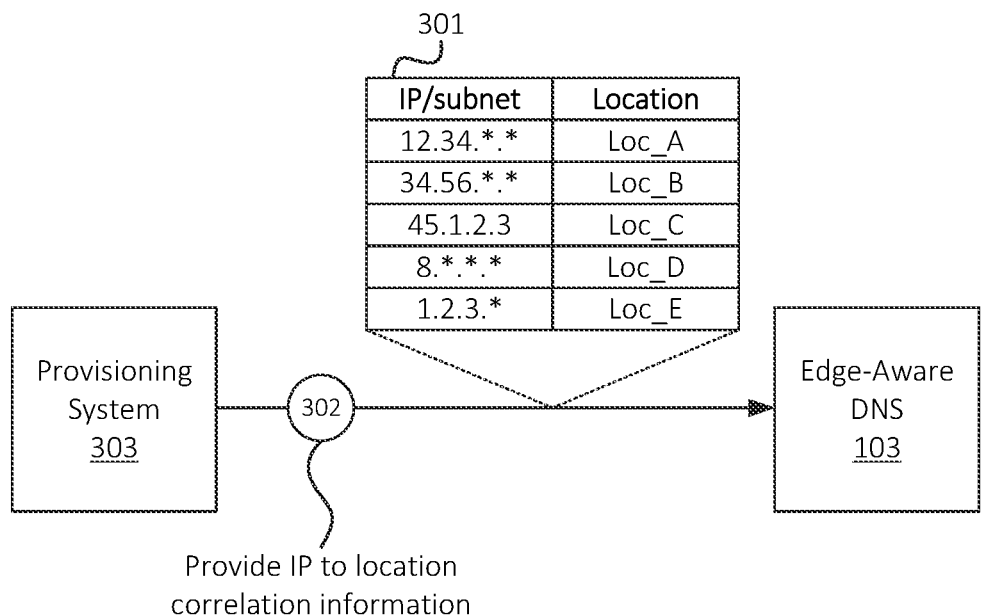

As shown in FIG. 3, EADNS 103 may also receive (at 302) information correlating IP addresses to respective locations. Such information is reflected in example data structure 301. The IP addresses shown in data structure 301 may be IP addresses of UEs that receive wireless connectivity from a wireless network. Such IP addresses may be assigned or maintained by provisioning system 303 associated with the wireless network. In some embodiments, provisioning system 303 may assign IP addresses to UEs on the basis of location. Such locations may be associated with, for example, particular cell tracking areas, particular cell sectors, particular base stations, particular geographical regions, etc. in which such UEs are located. For example, for a first UE connecting to the wireless network via a first base station located in a first location (and/or otherwise located at the first location or within a first region), provisioning system 303 may assign an IP address in a first IP address range or subnet. For a second UE connecting to the wireless network via a second base station located in a second location (and/or otherwise located at the second location or within a second region), provisioning system 303 may assign an IP address in a second IP address range or subnet.

In this manner, data structure 301 may reflect locations of UEs with particular IP addresses. For example, UEs with IP addresses beginning with "12.34" may be located at a first location (e.g., "Loc_A"), UEs with IP addresses beginning with "34.56" may be located at a second location (e.g., "Loc_B"), and so on. In practice, the IP addresses or address ranges of respective UEs may be reflected in data structure 301 in some other suitable manner.

Figure 4:
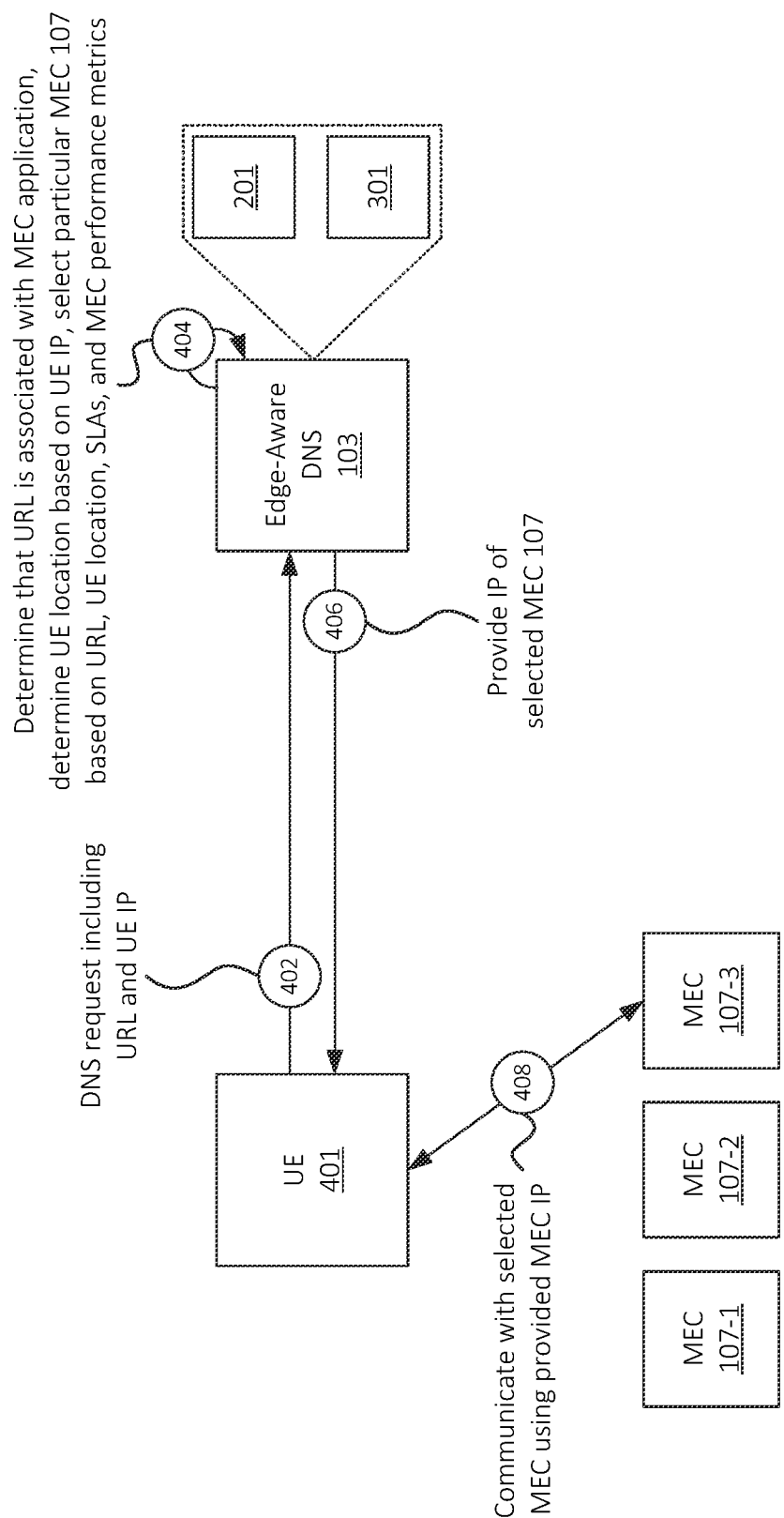
FIG. 4 illustrates an example of performing an edge-aware domain name resolution procedure, in accordance with some embodiments.

FIG. 4 illustrates an example of a particular UE 401 receiving service associated with a particular application from a particular MEC 107 that is selected based on the information described above. As shown, UE 401 may output (at 402) a request to resolve a URL (e.g., a Domain Name System ("DNS") request) that is associated with the application. UE 401 may, for example, execute an application that is configured to communicate with the URL to receive the service. As another example, UE 401 may receive a request to navigate to the URL via a browser. In some embodiments, UE 401 may output the DNS request to resolve the particular URL in response to some other operation or mechanism. An operating system or other component of UE 401 may be configured to issue such requests to EADNS 103. For example, EADNS 103 may be, may include, or may be communicatively coupled to a "default" or "primary" DNS server associated with UE 401. The DNS request (at 402) may further include an identifier of UE 401, such as an IP address of UE 401 (e.g., as assigned by provisioning system 303).

Based on receiving the DNS request, EADNS 103 may determine (at 404) that the requested URL is associated with a MEC application. For example, EADNS 103 may perform a pattern matching operation or other suitable operation (e.g., comparing the received URL to URLs or other conditions indicated in data structure 201) to determine that the requested URL is associated with an application that is installed at one or more MECs 107.

Based on determining that the URL in the DNS request is associated with a MEC application, EADNS 103 may further determine (at 404) a location of UE 401 based on the IP address of UE 401. For example, EADNS 103 may identify a particular location that corresponds to the IP address of UE 401, as indicated in data structure 301. EADNS 103 may further select a particular MEC 107 based on the location of UE 401 and one or more other factors. Such factors may include locations of respective MECs 107 (e.g., MECs 107 that are located relatively close to UE 401), performance and/or load metrics of MECs 107 (e.g., MECs 107 that have sufficient capacity to accommodate providing the application to UE 401 and/or MECs 107 that are able to meet the SLAs associated with the particular application), and/or other suitable factors. Selecting a particular MEC 107 may include identifying an IP address of the selected MEC 107 (i.e., an IP address of MEC 107-3, in this example).

EADNS 103 may accordingly provide (at 406) the IP address of the selected MEC 107. UE 401 may use the IP address of the selected MEC 107 to communicate (at 408) with the selected MEC 107 (i.e., MEC 107-3, in this example). Communicating with MEC 107-3 may include receiving service associated with the particular application. For example, UE 401 may execute a "client side" application, such as a gaming application, a voice call application, etc. that communicates with MEC 107-3, where MEC 107-3 executes a corresponding "server side" application.

Figure 5:
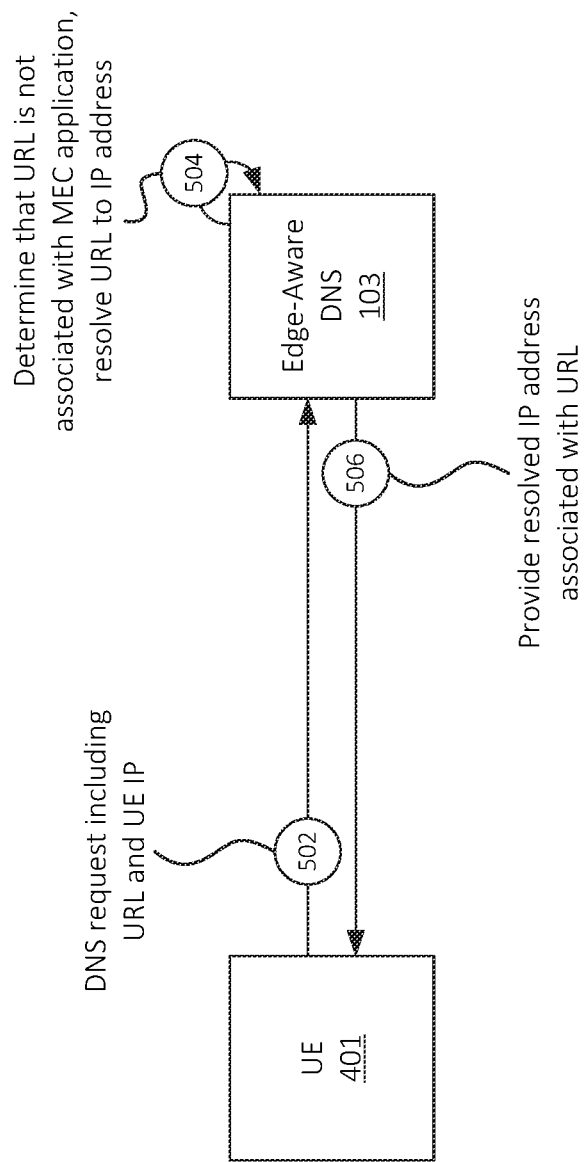
FIG. 5 illustrates an example of resolving a domain name that is not associated with an edge computing device, in accordance with some embodiments.

FIG. 5 illustrates an example scenario in which EADNS 103 handles a DNS request that does not indicate an application installed at a given MEC 107. As shown, UE 401 may output (at 502) a DNS request to EADNS 103, and EADNS 103 may determine (at 504) that a URL included in the DNS request is not associated with a MEC application. For example, EADNS 103 may compare the URL to information stored in data structure 201 and may identify that the URL does not match any URLs, conditions, etc. specified in data structure 201. EADNS 103 may resolve (at 504) the URL to an IP address, such as by checking a DNS cache, an authoritative DNS, and/or otherwise identifying an IP address that corresponds to the requested URL. That is, since the URL is not associated with a MEC application, EADNS 103 may forgo identifying a location of UE 401, selecting a MEC 107, and/or other operations described above. EADNS may respond to the DNS request by providing (at 506) the IP address that was determined (at 504) as resolving the URL included in the DNS request.

Figure 6:
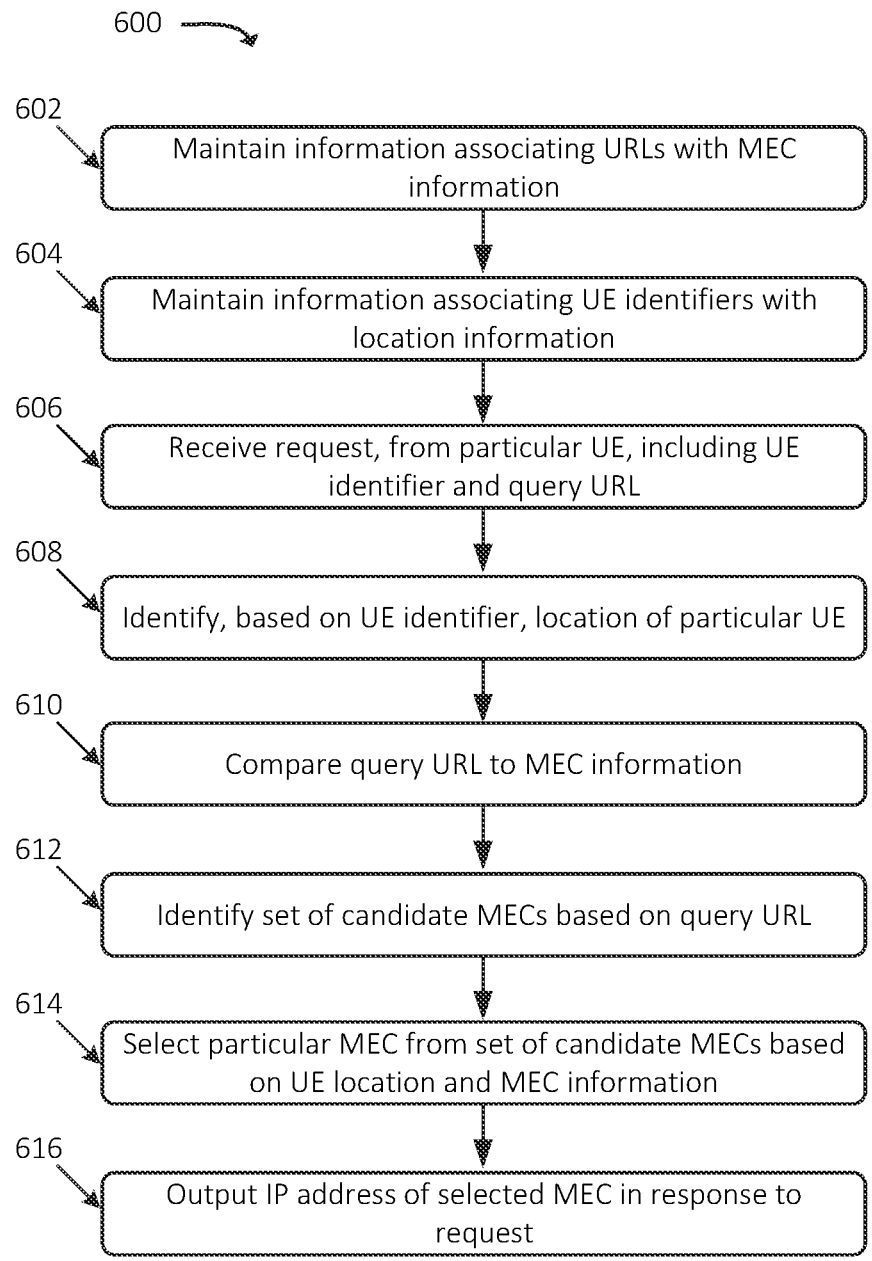
FIG. 6 illustrates an example process for performing an edge-aware domain name resolution procedure, in accordance with some embodiments.

FIG. 6 illustrates an example process 600 for performing an edge-aware domain name resolution procedure. In some embodiments, some or all of process 600 may be performed by EADNS 103. In some embodiments, one or more other devices may perform some or all of process 600 in concert with, and/or in lieu of, EADNS 103.

As shown, process 600 may include maintaining (at 602) information associating a set of URLs with MEC information. For example, as discussed above, EADNS 103 may receive, maintain, access, etc. information associating one or more URLs with a respective set of MECs 107. The MEC information for each MEC 107 may include MEC locator information, such as IP addresses for each MEC 107. In some embodiments, the MEC information for each MEC 107 may include additional information, such as a location of each MEC 107, MEC performance and/or load information (which may, in some embodiments, be updated on an ongoing basis), MEC configuration information, and/or other information associated with each MEC 107. Each set of MECs 107 that are associated with a given URL may, as discussed above, be configured to provide one or more services associated with the given URL. For example, each MEC 107 associated with a particular URL may have installed, or may be able to execute or install, one or more particular applications that are associated with the particular URL. In some embodiments, the information maintained (at 602) may include and/or may otherwise be represented as data structure 201.

Process 600 may further include maintaining (at 604) information associating one or more UE identifiers with respective location information. In some embodiments, the UE identifiers may include IP addresses, or ranges of IP addresses (e.g., IP subnets). In some embodiments, the UE identifiers may additionally, or alternatively, include one or more other types of UE identifiers, such as Mobile Directory Numbers ("MDNs"), International Mobile Station Equipment Identity ("IMEI") values, International Mobile Subscriber Identity ("IMSI") values, Subscription Permanent Identifiers ("SUPIs"), Globally Unique Temporary Identifiers ("GUTIs"), and/or other suitable UE identifiers. The location information may include latitude and longitude coordinates, cell tracking areas, base station identifiers, and/or other suitable indicators of locations or geographical regions. In some embodiments, the information maintained (at 604) may include and/or may otherwise be represented as data structure 301.

Process 600 may additionally include receiving (at 606) a request, from a particular UE 401, that includes an identifier of the particular UE 401 and a query URL. For example, as discussed above, UE 401 may output a request to resolve the query URL to an IP address (e.g., a DNS request). The request may include an IP address and/or other suitable identifier of the particular UE 401.

Process 600 may also include identifying (at 608), based on the UE identifier in the request, a location of the particular UE 401. For example, EADNS 103 may compare the UE identifier to the UE identifiers maintained (at 604) by EADNS 103 to identify a matching UE identifier in the maintained information. EADNS 103 may further identify a location, indicated in the maintained information, associated with the identified UE identifier. In this manner, EADNS 103 may identify the location of the particular UE 401 without explicitly requesting or receiving the location from UE 401.

Process 600 may further include comparing (at 610) the query URL to the MEC information. For example, EADNS 103 may compare the query URL, included in the request from the particular UE 401, to the URLs included in the maintained (at 602) MEC information, to identify whether the query URL matches any of the URLs included in the maintained MEC information. As discussed above with respect to FIG. 5, in the event that none of the URLs in the maintained MEC information match the query URL, EADNS 103 may resolve the query URL to an IP address via a cached DNS entry, by consulting an authoritative DNS, etc. Additionally, or alternatively, EADNS 103 may forward or hand off the request to another device or system, such as a DNS that does not maintain MEC information.

On the other hand, in the event that the query URL matches a particular URL included in the MEC information, process 600 may additionally include identifying (at 612) a set of candidate MECs 107 based on the query URL. For example, EADNS 103 may identify one or more MECs 107 with which the URL is associated (e.g., as indicated in data structure 201). The candidate set of MECs 107 may be MECs 107 that have installed a particular application, for which the particular application is accessible, and/or that are otherwise capable of providing a particular service with which the query URL is associated.

Process 600 may also include selecting (at 614) a particular MEC 107 from the candidate set of MECs 107 based on the location of the particular UE 401 and the MEC information. For example, as discussed above, EADNS 103 may select a particular MEC 107 based on one or more factors, such as a proximity of MEC 107 to the particular UE 401 (e.g., based on the location of the particular UE 401 and the candidate MECs 107), load information of the candidate MECs 107 (e.g., may forgo selecting an overloaded MEC 107, may more heavily weight an underutilized MEC 107, etc.), performance information of the candidate MECs 107 (e.g., whether such MECs 107 are able to provide one or more SLAs associated with a service associated with the URL), and/or other suitable factors. In some embodiments, as discussed above, the performance information may be different for different locations, such as different measures of latency for a given MEC 107 with respect to UEs located at different locations (e.g., different distances from MEC 107).

Process 600 may further include outputting (at 616) an IP address associated with the selected MEC 107 in response to the request. For example, EADNS 103 may respond to the particular UE 401 with the IP address of the selected MEC 107. In this manner, UE 401 may receive location-based edge computing services from the particular MEC 107, which has been selected in accordance with the location of UE 401 as well as SLAs associated with a particular service, without UE 401 needing to explicitly provide its location or the SLAs associated with the particular service.

Figure 7:
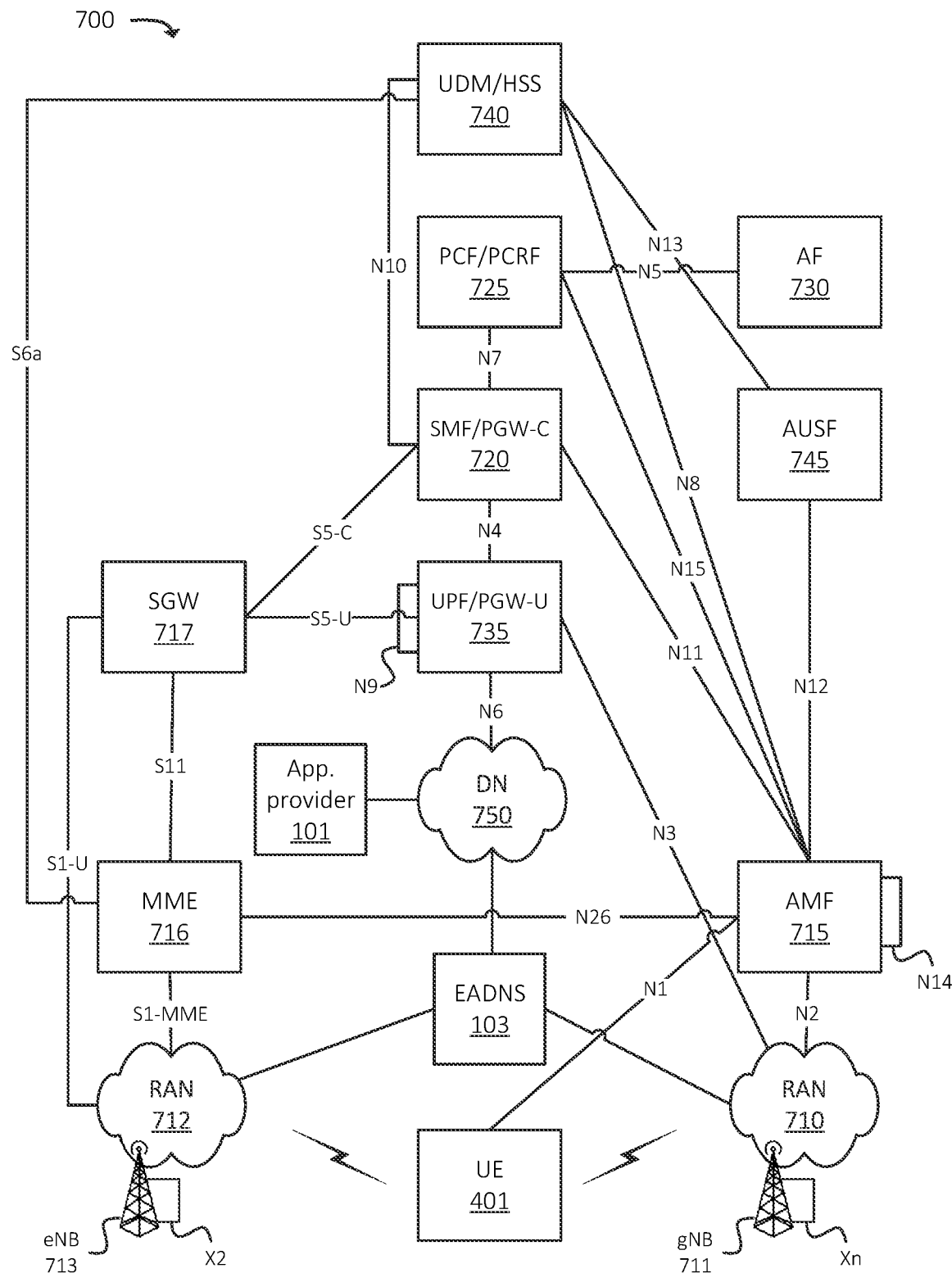
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5GC"). As shown, environment 700 may include UE 401, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Unified Data Management ("UDM")/Home Subscriber Server ("HSS") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as application provider 101 and/or EADNS 103.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF/PGW-C 720, PCF/PCRF 725, UPF/PGW-U 735, UDM/HSS 740, and/or AUSF 745, while another slice may include a second instance of SMF/PGW-C 720, PCF/PCRF 725, UPF/PGW-U 735, UDM/HSS 740, and/or AUSF 745). The different slices may provide differentiated levels of service, such as service in accordance with different SLAs, QoS parameters, etc.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Elements of environment 700 may interconnect with each other and/or other devices via wired connections, wireless connections, or a combination of wired and wireless connections. Examples of interfaces or communication pathways between the elements of environment 700, as shown in FIG. 7, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 7, such as Service-Based Interfaces ("SBIs"), including an Namf interface, an Nudm interface, an Npcf interface, an Nupf interface, an Nnef interface, an Nsmf interface, and/or one or more other SBIs.

UE 401 may include a computation and communication device, such as a wireless mobile communication device that is capable of communicating with RAN 710, RAN 712, and/or DN 750. UE 401 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 401 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 401 may communicate with one or more other elements of environment 700. UE 401 may communicate with RAN 710 via an air interface (e.g., as provided by gNB 711). For instance, RAN 710 may receive traffic (e.g., user plane traffic such as voice call traffic, data traffic, messaging traffic, etc.) from UE 401 via the air interface, and may communicate the traffic to UPF/PGW-U 735 and/or one or more other devices or networks. Further, RAN 710 may receive signaling traffic, control plane traffic, etc. from UE 401 via the air interface, and may communicate such signaling traffic, control plane traffic, etc. to AMF 715 and/or one or more other devices or networks. Additionally, RAN 710 may receive traffic intended for UE 401 (e.g., from UPF/PGW-U 735, AMF 715, and/or one or more other devices or networks) and may communicate the traffic to UE 401 via the air interface.

RAN 712 may be, or may include, a LTE RAN that includes one or more base stations (e.g., one or more eNBs 713), via which UE 401 may communicate with one or more other elements of environment 700. UE 401 may communicate with RAN 712 via an air interface (e.g., as provided by eNB 713). For instance, RAN 712 may receive traffic (e.g., user plane traffic such as voice call traffic, data traffic, messaging traffic, signaling traffic, etc.) from UE 401 via the air interface, and may communicate the traffic to UPF/PGW-U 735 (e.g., via SGW 717) and/or one or more other devices or networks. Further, RAN 712 may receive signaling traffic, control plane traffic, etc. from UE 401 via the air interface, and may communicate such signaling traffic, control plane traffic, etc. to MME 716 and/or one or more other devices or networks. Additionally, RAN 712 may receive traffic intended for UE 401 (e.g., from UPF/PGW-U 735, MME 716, SGW 717, and/or one or more other devices or networks) and may communicate the traffic to UE 401 via the air interface.

AMF 715 may include one or more devices, systems, Virtualized Network Functions ("VNFs"), Cloud-Native Network Functions ("CNFs"), etc., that perform operations to register UE 401 with the 5G network, to establish bearer channels associated with a session with UE 401, to hand off UE 401 from the 5G network to another network, to hand off UE 401 from the other network to the 5G network, manage mobility of UE 401 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 401 with the EPC, to establish bearer channels associated with a session with UE 401, to hand off UE 401 from the EPC to another network, to hand off UE 401 from another network to the EPC, manage mobility of UE 401 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 401. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 401, from DN 750, and may forward the user plane data toward UE 401 (e.g., via RAN 710, SMF/PGW-C 720, and/or one or more other devices). In some embodiments, multiple UPFs 735 may be deployed (e.g., in different geographical locations), and the delivery of content to UE 401 may be coordinated via the N9 interface (e.g., as denoted in FIG. 7 by the line marked "N9" originating and terminating at UPF/PGW-U 735). Similarly, UPF/PGW-U 735 may receive traffic from UE 401 (e.g., via RAN 710, RAN 712, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. AUSF 745 and/or UDM/HSS 740 may perform authentication, authorization, and/or accounting operations associated with the subscriber and/or a communication session with UE 401.

DN 750 may include one or more wired and/or wireless networks. For example, DN 750 may include an IP-based PDN, a wide area network ("WAN") such as the Internet, a private enterprise network, and/or one or more other networks. UE 401 may communicate, through DN 750, with data servers, other UEs 401, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 401 may communicate.

Figure 8:
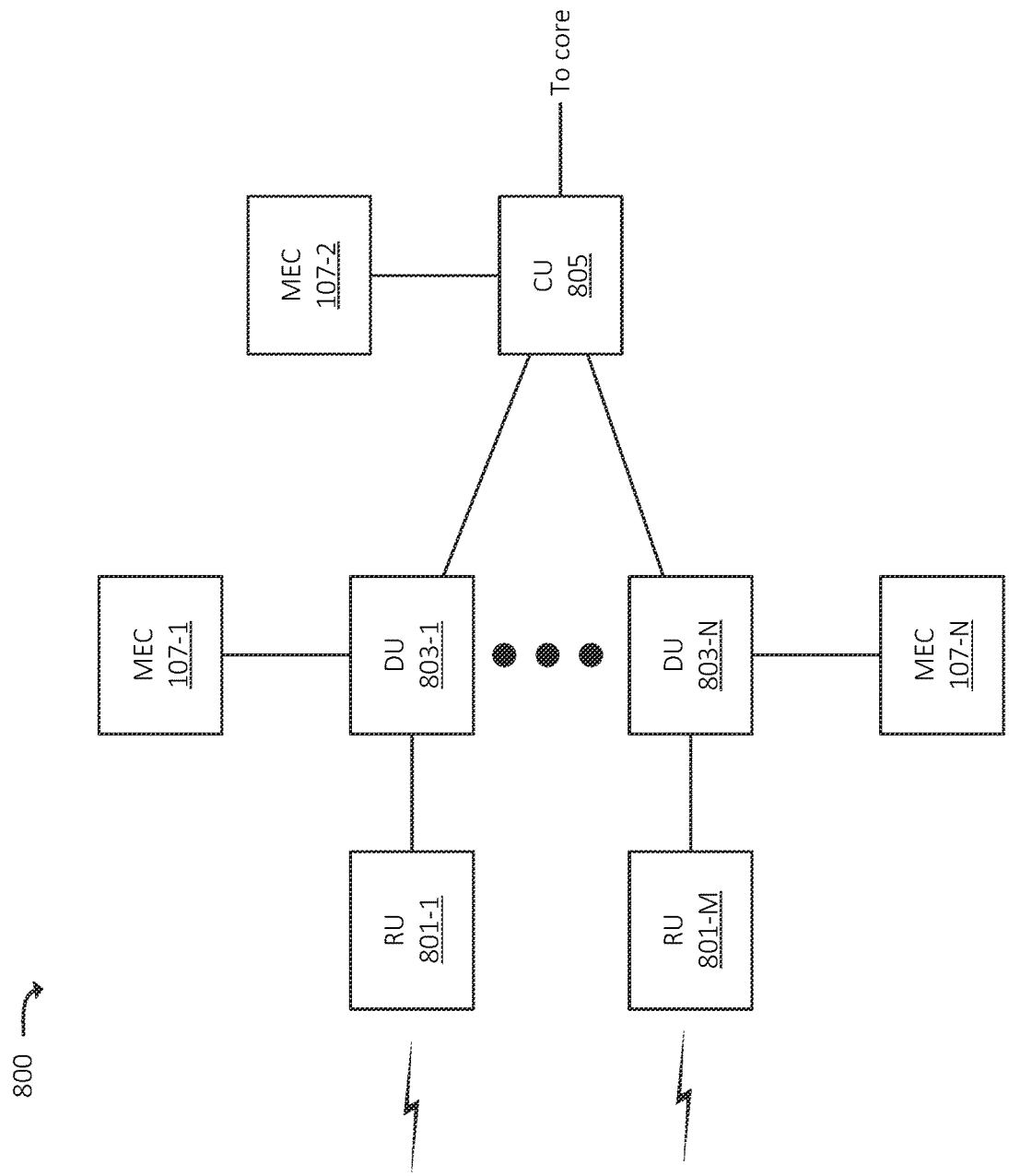
FIG. 8 illustrates an example arrangement of a radio access network ("RAN"), in accordance with some embodiments.

FIG. 8 illustrates an example RAN environment 800, which may be included in and/or implemented by one or more RANs (e.g., RAN 710, RAN 712, or some other RAN). In some embodiments, a particular RAN may include one RAN environment 800. In some embodiments, a particular RAN may include multiple RAN environments 800. In some embodiments, RAN environment 800 may correspond to a particular gNB 711 of a 5G RAN (e.g., RAN 710). In some embodiments, RAN environment 800 may correspond to multiple gNBs 711. In some embodiments, RAN environment 800 may correspond to one or more other types of base stations of one or more other types of RANs. As shown, RAN environment 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 401 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 401, and may determine which DU(s) 803 should receive the downlink traffic. DU 803 may include one or more devices that transmit traffic between a core network (e.g., via CU 805) and UE 401 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 401.

RU 801 may include hardware circuitry (e.g., one or more RF transceivers, antennas, radios, and/or other suitable hardware) to communicate wirelessly (e.g., via an RF interface) with one or more UEs 401, one or more other DUs 803 (e.g., via RUs 801 associated with DUs 803), and/or any other suitable type of device. In the uplink direction, RU 801 may receive traffic from UE 401 and/or another DU 803 via the RF interface and may provide the traffic to DU 803. In the downlink direction, RU 801 may receive traffic from DU 803, and may provide the traffic to UE 401 and/or another DU 803.

One or more elements of RAN environment 800 may, in some embodiments, be communicatively coupled to one or more Multi-Access/Mobile Edge Computing ("MEC") devices, referred to sometimes herein simply as "MECs" 107. For example, DU 803-1 may be communicatively coupled to MEC 107-1, DU 803-N may be communicatively coupled to MEC 107-N, CU 805 may be communicatively coupled to MEC 107-2, and so on. MECs 107 may include hardware resources (e.g., configurable or provisionable hardware resources) that may be configured to provide services and/or otherwise process traffic to and/or from UE 401, via a respective RU 801.

For example, DU 803-1 may route some traffic, from UE 401, to MEC 107-1 instead of to a core network via CU 805. MEC 107-1 may process the traffic, perform one or more computations based on the received traffic, and may provide traffic to UE 401 via RU 801-1. In some embodiments, MEC 107 may include, and/or may implement, some or all of the functionality described above with respect AF 730, UPF 735, and/or one or more other devices, systems, VNFs, CNFs, etc. In this manner, ultra-low latency services may be provided to UE 401, as traffic does not need to traverse DU 803, CU 805, links between DU 803 and CU 805, and an intervening backhaul network between RAN environment 800 and the core network.

Figure 9:
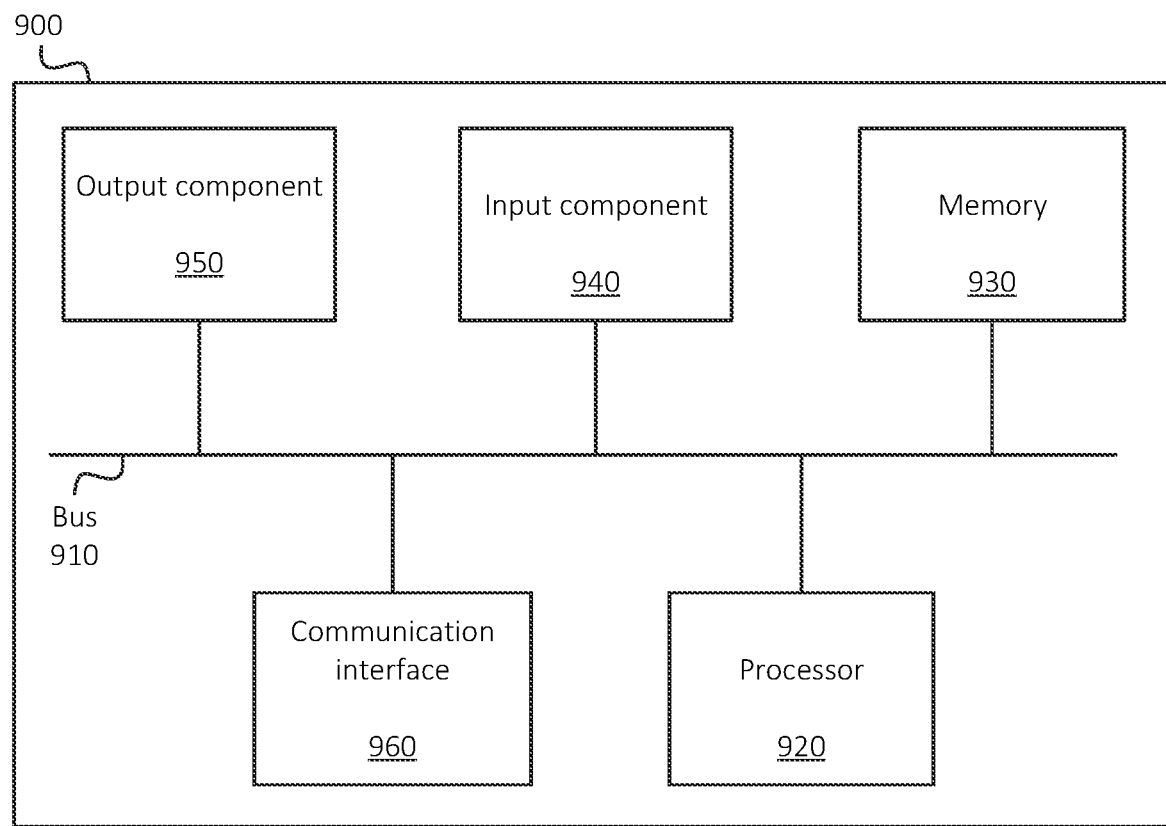
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions (e.g., processor-executable instructions). In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to input component 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions, such as software instructions, processor-executable instructions, etc., stored in a computer-readable medium, such as memory 930. A computer-readable medium may be defined as a non-transitory memory device. A memory device may include space within a single physical memory device or spread across multiple physical memory devices. The instructions may be read into memory 930 from another computer-readable medium or from another device. The instructions stored in memory 930 may be processor-executable instructions that cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or,"

as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more hardware processors configured to:
maintain first information associating one or more Uniform Resource Locator ("URLs") with respective Internet Protocol ("IP") addresses of one or more edge computing devices;
maintain second information associating one or more User Equipment ("UE") identifiers with one or more locations;
receive a request, from a particular UE, wherein the request includes an identifier of the particular UE and a particular URL;
identify, based on the identifier of the particular UE and the second information, a location of the particular UE;
compare the particular URL, included in the request, to the one or more URLs included in the first information;
determine, based on the comparing, that the particular URL is associated with a particular set of edge computing devices, of the one or more edge computing devices;
select, based on the location of the particular UE, a particular edge computing device of the particular set of edge computing devices; and
output, to the particular UE and in response to the request, a particular IP address of the selected particular edge computing device.

2. The device of claim 1, wherein the request includes a Domain Name System ("DNS") request.

3. The device of claim 1, wherein the identifier of the particular UE includes an IP address of the particular UE.

4. The device of claim 1, wherein the UE identifiers included in the second information include a plurality of IP subnets.

5. The device of claim 1, wherein the one or more edge computing devices are each associated with a particular location, wherein selecting the particular edge computing device includes selecting the particular edge computing device based on a location of the particular edge computing device and the location of the particular UE.

6. The device of claim 1, wherein the first information further includes performance information associated with each edge computing device of the one or more edge computing devices, wherein selecting the particular edge computing device includes selecting the particular edge computing device based on the performance information associated with the particular edge computing device.

7. The device of claim 6, wherein the performance information associated with each edge computing device includes latency information between the each edge computing device and the location of the particular UE, wherein selecting the particular edge computing device includes selecting the particular edge computing device based on the latency information between the particular edge computing device and the location of the particular UE.

8. A non-transitory computer-readable medium, storing a plurality of processor-executable instructions to:
maintain first information associating one or more Uniform Resource Locator ("URLs") with respective Internet Protocol ("IP") addresses of one or more edge computing devices;
maintain second information associating one or more User Equipment ("UE") identifiers with one or more locations;
receive a request, from a particular UE, wherein the request includes an identifier of the particular UE and a particular URL;
identify, based on the identifier of the particular UE and the second information, a location of the particular UE;
compare the particular URL, included in the request, to the one or more URLs included in the first information;
determine, based on the comparing, that the particular URL is associated with a particular set of edge computing devices, of the one or more edge computing devices;
select, based on the location of the particular UE, a particular edge computing device of the particular set of edge computing devices; and
output, to the particular UE and in response to the request, a particular IP address of the selected particular edge computing device.

9. The non-transitory computer-readable medium of claim 8, wherein the request includes a Domain Name System ("DNS") request.

10. The non-transitory computer-readable medium of claim 8, wherein the identifier of the particular UE includes an IP address of the particular UE.

11. The non-transitory computer-readable medium of claim 8, wherein the UE identifiers included in the second information include a plurality of IP subnets.

12. The non-transitory computer-readable medium of claim 8, wherein the one or more edge computing devices are each associated with a particular location, wherein selecting the particular edge computing device includes selecting the particular edge computing device based on a location of the particular edge computing device and the location of the particular UE.

13. The non-transitory computer-readable medium of claim 8, wherein the first information further includes performance information associated with each edge computing device of the one or more edge computing devices, wherein selecting the particular edge computing device includes selecting the particular edge computing device based on the performance information associated with the particular edge computing device.

14. The non-transitory computer-readable medium of claim 13, wherein the performance information associated with each edge computing device includes latency information between the each edge computing device and the location of the particular UE, wherein selecting the particular edge computing device includes selecting the particular edge computing device based on the latency information between the particular edge computing device and the location of the particular UE.

15. A method, comprising:
maintaining first information associating one or more Uniform Resource Locator ("URLs") with respective Internet Protocol ("IP") addresses of one or more edge computing devices;
maintaining second information associating one or more User Equipment ("UE") identifiers with one or more locations;

receiving a request, from a particular UE, wherein the request includes an identifier of the particular UE and a particular URL;

identifying, based on the identifier of the particular UE and the second information, a location of the particular UE;

comparing the particular URL, included in the request, to the one or more URLs included in the first information;

determining, based on the comparing, that the particular URL is associated with a particular set of edge computing devices, of the one or more edge computing devices;

selecting, based on the location of the particular UE, a particular edge computing device of the particular set of edge computing devices; and outputting, to the particular UE and in response to the request, a particular IP address of the selected particular edge computing device.

16. The method of claim 15, wherein the request includes a Domain Name System ("DNS") request.

17. The method of claim 15, wherein the identifier of the particular UE includes an IP address of the particular UE.

18. The method of claim 15, wherein the UE identifiers included in the second information include a plurality of IP subnets.

19. The method of claim 15, wherein the one or more edge computing devices are each associated with a particular location, wherein selecting the particular edge computing device includes selecting the particular edge computing device based on a location of the particular edge computing device and the location of the particular UE.

20. The method of claim 15, wherein the first information further includes latency information between each edge computing device of the one or more edge computing devices and the location of the particular UE, wherein selecting the particular edge computing device includes selecting the particular edge computing device based on the latency information between the particular edge computing device and the location of the particular UE.

* * * * *